(12) United States Patent
Sweeney

(10) Patent No.: US 7,322,314 B1
(45) Date of Patent: Jan. 29, 2008

(54) INSULATED ANIMAL ENCLOSURE

(76) Inventor: Linda J. Sweeney, 2268 Shore Dr., Saint Augustine, FL (US) 32086

( * ) Notice: Subject to any disclaimer, the term of this patent is extended or adjusted under 35 U.S.C. 154(b) by 232 days.

(21) Appl. No.: 11/122,607

(22) Filed: May 5, 2005

Related U.S. Application Data

(60) Provisional application No. 60/568,553, filed on May 6, 2004.

(51) Int. Cl.
*A01K 1/03* (2006.01)

(52) U.S. Cl. .................. 119/483; 119/484; 119/475

(58) Field of Classification Search .............. 119/483, 119/482, 484, 496, 497, 475, 479, 498; 62/457.1, 62/457.3, 457.4; 220/592.01
See application file for complete search history.

(56) References Cited

U.S. PATENT DOCUMENTS

| | | | | | |
|---|---|---|---|---|---|
| 1,748,349 | A | * | 2/1930 | Ijams | 119/432 |
| 3,566,842 | A | * | 3/1971 | Oldaker | 119/430 |
| 3,861,356 | A | * | 1/1975 | Kulka | 119/482 |
| 3,958,535 | A | * | 5/1976 | Salvia | 119/72.5 |
| 4,022,159 | A | * | 5/1977 | Salvia | 119/496 |
| 4,287,854 | A | * | 9/1981 | Hansen et al. | 119/455 |
| 4,827,872 | A | * | 5/1989 | Sommers | 119/482 |
| 4,869,206 | A | * | 9/1989 | Spina | 119/417 |
| 4,899,693 | A | * | 2/1990 | Arnold | 119/28.5 |
| 4,962,729 | A | * | 10/1990 | Barreto et al. | 119/482 |
| 5,136,980 | A | * | 8/1992 | Schoeber et al. | 119/448 |
| 5,216,977 | A | * | 6/1993 | Allen, Jr. | 119/500 |
| 5,349,924 | A | * | 9/1994 | Hooper, Jr. | 119/496 |
| 5,448,965 | A | * | 9/1995 | McClure | 119/482 |
| 5,615,640 | A | * | 4/1997 | Luiz | 119/482 |
| 5,727,501 | A | * | 3/1998 | York | 119/482 |
| 5,746,271 | A | * | 5/1998 | DeCosta | 165/53 |
| 5,755,183 | A | * | 5/1998 | Udelle et al. | 119/622 |
| 5,761,992 | A | * | 6/1998 | Gallo | 99/468 |
| 5,842,571 | A | * | 12/1998 | Rausch | 206/549 |
| 5,881,678 | A | * | 3/1999 | Morley | 119/496 |
| 5,887,436 | A | * | 3/1999 | Duddleston | 62/3.62 |
| 5,924,303 | A | * | 7/1999 | Hodosh | 62/457.4 |
| 5,950,568 | A | * | 9/1999 | Axelrod et al. | 119/499 |
| 5,964,190 | A | * | 10/1999 | Willinger et al. | 119/500 |
| 6,003,329 | A | * | 12/1999 | Stanton, Jr. | 62/372 |
| 6,047,662 | A | * | 4/2000 | Fekete | 119/416 |
| 6,067,816 | A | * | 5/2000 | Hodosh | 62/457.4 |
| 6,131,534 | A | * | 10/2000 | Axelrod | 119/499 |
| 6,234,116 | B1 | * | 5/2001 | Havener | 119/482 |
| 6,439,165 | B1 | * | 8/2002 | Guard | 119/496 |
| 6,446,577 | B1 | * | 9/2002 | Salahor | 119/497 |
| 6,490,995 | B2 | * | 12/2002 | Greene, Jr. | 119/496 |
| 6,609,392 | B1 | * | 8/2003 | Brown | 62/457.1 |
| 6,629,430 | B2 | * | 10/2003 | Mills et al. | 62/457.2 |

(Continued)

*Primary Examiner*—Yvonne R. Abbott
(74) *Attorney, Agent, or Firm*—Gold & Rizvi, P.A.; H. John Rizvi; Glenn E. Gold

(57) ABSTRACT

An insulated animal enclosure configured to be conveniently maintained at a cool and comfortable interior temperature. The insulated animal enclosure includes an inner habitat and an outer housing. The cuter housing includes an opening configured to receive the inner habitat therein and substantially surrounds the inner habitat at a spaced-apart distance thereof. Cooling means are placed within the spaced-apart distance between the outer housing and the inner habitat to assist in maintaining a controlled temperature environment. The inner habitat additionally includes an opening therein to allow an animal to enter and exit the structure at will.

3 Claims, 3 Drawing Sheets

U.S. PATENT DOCUMENTS

| | | | |
|---|---|---|---|
| 6,647,924 B1 * | 11/2003 | Zwicker et al. | 119/452 |
| 6,868,803 B1 * | 3/2005 | Little | 119/498 |
| 6,923,144 B2 * | 8/2005 | Little | 119/482 |
| 7,013,671 B1 * | 3/2006 | Bolda | 62/457.7 |
| 7,025,019 B2 * | 4/2006 | Axelrod et al. | 119/499 |
| 7,051,679 B2 * | 5/2006 | Bello | 119/482 |
| 7,134,404 B2 * | 11/2006 | Slone | 119/501 |
| 7,140,507 B2 * | 11/2006 | Maldonado et al. | 220/592.2 |
| 2002/0148410 A1 * | 10/2002 | Thomas | 119/452 |
| 2004/0112300 A1 * | 6/2004 | Heygen | 119/416 |
| 2005/0056232 A1 * | 3/2005 | O'Niell | 119/500 |
| 2006/0054102 A1 * | 3/2006 | Hailey | 119/482 |

* cited by examiner

INSULATED ANIMAL ENCLOSURE

CROSS REFERENCE TO RELATED APPLICATION

This application claims the benefit of co-pending U.S. provisional patent application Ser. No. 60/568,553, filed on May 6, 2004, the entire specification of which is incorporated herein by reference.

BACKGROUND OF THE INVENTION

1. Field of the Invention

The present invention relates generally to enclosures for animals, and more particularly, to an insulated animal enclosure configured to be conveniently maintained at a cool and comfortable interior temperature.

2. Description of the Prior Art

A wide variety of animals require carefully maintained environments while in captivity in order to survive. Many domesticated animals have been transported to geographic locations unsuited for their survival and depend heavily upon owner care for comfort and survival.

Animal caretakers have resorted to a number of solutions in their effort to lessen the discomfort and potential dangers posed by excessively hot or cold environments.

Such solutions have ranged from simplistic measures, such as placing an ice bottle inside the animal's cage, to complex electrically powered cooling mechanisms.

Although a variety of different approaches have been attempted in the past, existing solutions have consisted basically of familiar, expected, and obvious structural configurations that have proven to be inadequate or impractical in application.

In this respect, there is a need in the art for a temperature controlled insulated animal enclosure that substantially departs from the prior art, and in so doing, provides a simple, convenient, and practical solution that reduces animal suffering as well as health complications including heatstroke, frostbite, and even death.

SUMMARY OF THE INVENTION

The present invention is directed to an insulated animal enclosure configured to be conveniently maintained at a cool and comfortable interior temperature.

An object of the present invention is to provide an insulated animal enclosure that is lightweight and portable so that it can be easily and conveniently moved as desired.

A further object of the present invention is to provide an insulated animal enclosure configured to provide a temperature-controlled water supply as desired.

Another object of the present invention is to provide an insulated animal enclosure having conveniently located handles to assist in transport.

An additional object of the present invention is to provide an insulated animal enclosure having an opening therein to permit an animal to easily enter and exit the structure at will.

A further object of the present invention is to provide an insulated animal enclosure configured with draining means therein to permit the evacuation of liquid from inside the structure, such as, for example, from condensation.

Yet another object of the present invention is to provide an insulated animal enclosure that is not reliant on electrical or battery power.

It is also an object of the present invention to provide an insulated animal enclosure that is free from noise and/or vibrations.

Another object of the present invention is to provide an insulated animal enclosure that permits a pet owner to leave their animal unattended for extended periods of time without having to worry about the pet suffering from discomfort due to excessive heat or cold possibly leading to heatstroke, frostbite, and in extreme cases, even death.

In accordance with a first aspect of the invention, an insulated animal enclosure is configured to be conveniently maintained at a cool and comfortable interior temperature. The insulated animal enclosure includes an inner habitat and an outer housing. The outer housing includes an opening configured to receive the inner habitat therein and substantially surrounds the inner habitat at a spaced-apart distance thereof. Cooling means are placed within the spaced-apart distance between the outer housing and the inner habitat to assist in maintaining a controlled temperature environment. The inner habitat additionally includes an opening therein to allow an animal to enter and exit the structure at will.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Figure 1:
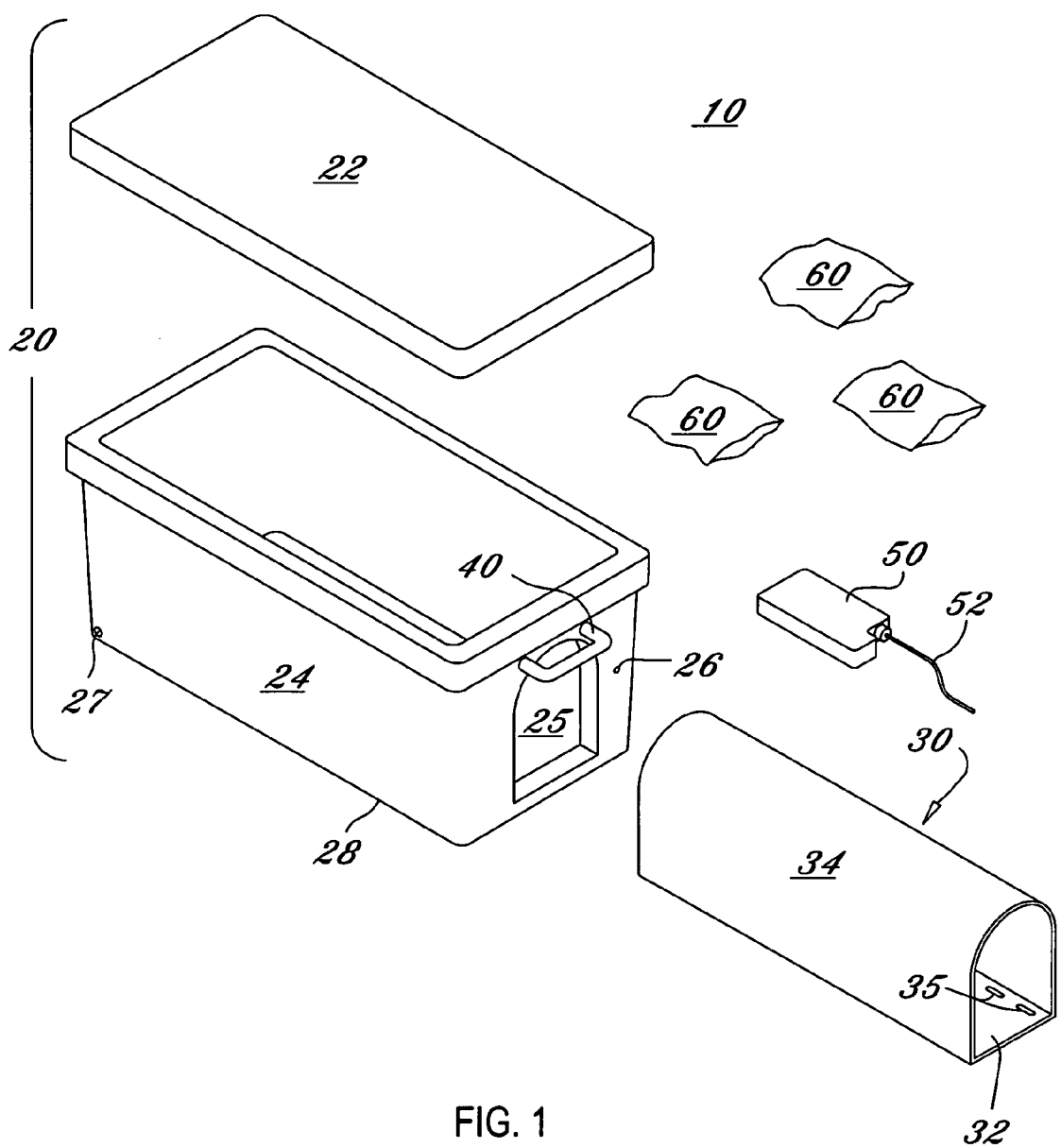
FIG. 1 is a perspective view of the insulated animal enclosure showing the inner habitat, cooling means, and water bottle before assembly in the outer housing in accordance with a preferred embodiment of the present invention.

Shown throughout the figures, the present invention is generally directed to an insulated animal enclosure 10 configured to be conveniently maintained at a cool and comfortable interior temperature.

The insulated animal enclosure 10 includes an inner habitat 30 and an outer housing 20. The outer housing 30 may be configured in any of a variety of different ways without departing from the present invention. In a most preferred embodiment, the outer housing 20 will be configured as an injection molded container formed from polyethylene, polypropylene, plastic by injection molding, or any of a variety of other similar materials. Although a number of different shapes may be utilized for the outer housing 20, it will preferably be formed with a bottom portion 28 having a plurality of upstanding side walls 24, and a cover portion 22 as shown throughout the figures. The bottom portion 28, plurality of upstanding side walls 24, and cover portion 22 of the outer housing will preferably be filled with an insulative material. It will be appreciated by those skilled in the art that any of a wide variety of known materials having insulative properties may be utilized for this purpose including polystyrene foam, Styrofoam, and the like.

Figure 2:
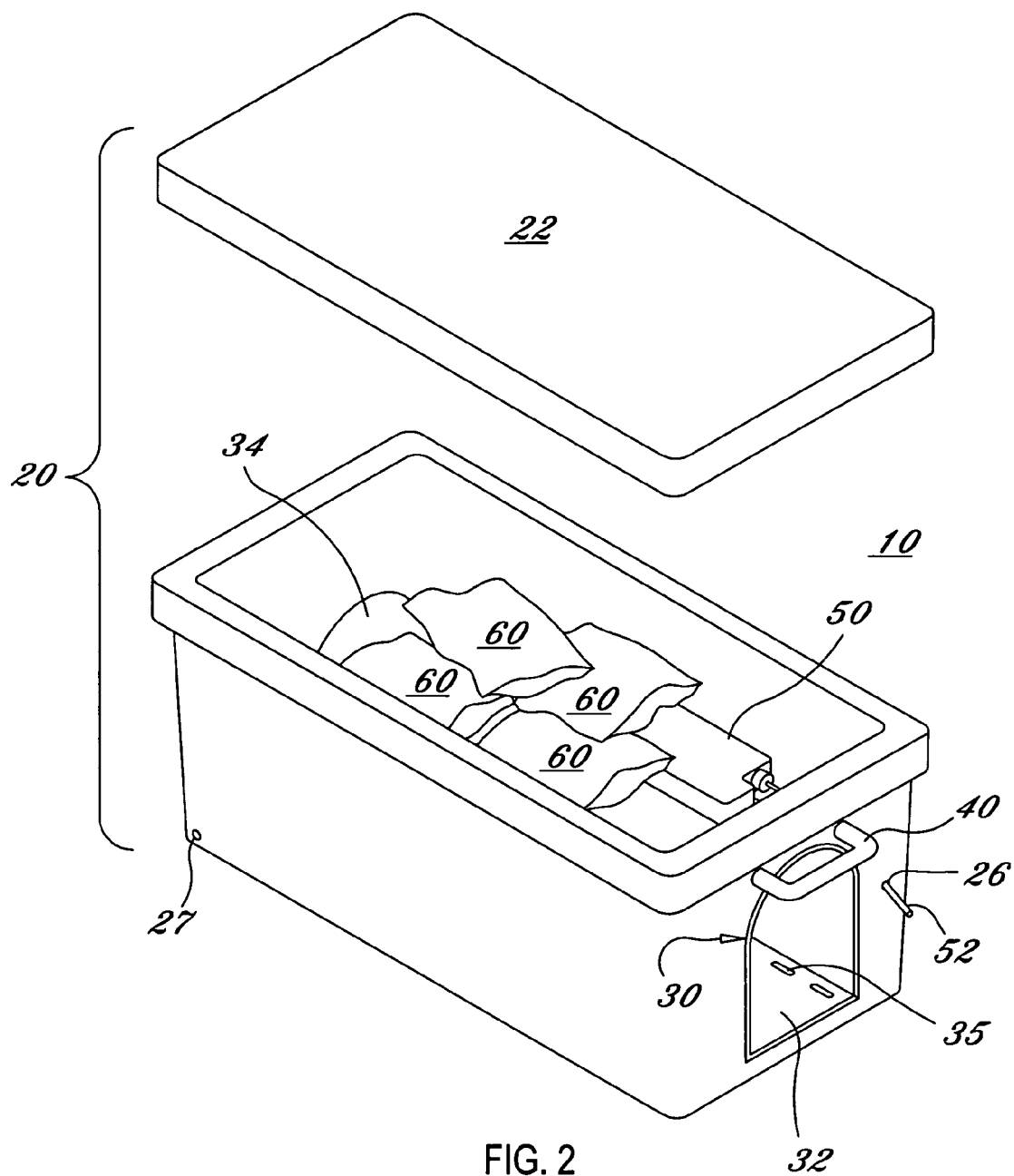
FIG. 2 is a perspective view of the insulated animal enclosure with the cover portion of the outer housing removed showing the inner habitat, cooling means, and water bottle after assembly in the outer housing in accordance with a preferred embodiment of the present invention.

As best illustrated in FIG. 1, the outer housing 20 will include an opening 25 therein to permit insertion of the inner habitat 30 therein. FIG. 1 shows the inner habitat 30 before insertion into the outer housing 20 of the insulated animal enclosure 10 of the present invention. A perspective view of the insulated animal enclosure is shown in FIG. 2 with the cover portion 22 of the outer housing 20 removed showing the inner habitat 30, and other components that will be described later, after assembly in the outer housing 20 in accordance with a preferred embodiment of the present invention. If desired, handles 40 may be provided as shown to enable convenient transport of the insulated animal enclosure 10 of the present invention. In one specific embodiment of the invention, a commercially available cooler may be utilized after having an opening 25 cut therein and other modifications performed as described in more detail herein.

The inner habitat 30 of the insulated animal enclosure of the present invention is configured to be positioned within the outer housing 20 in a spaced-apart manner as illustrated throughout the figures. In a preferred embodiment, the inner habitat 30 will include a bottom portion 32 and a top portion 34. In the preferred embodiment, the inner habitat 30 will include a relatively flat bottom portion 32 with a top portion 34 extending upwards therefrom to form a hollow habitable interior therein. The top portion 34 may be configured in any of a wide variety of known shapes without departing from the present invention. Preferably, the top portion 34 will include a plurality of upstanding sidewalls supporting a roof thereupon. The sidewalls and roof may be formed as a one-piece unitary structure, if desired, and shaped in a generally mailbox-like structure as shown throughout the figures. In one specific embodiment of the present invention, the inner habitat 30 may indeed be comprised of a standard U.S. mail box with the door removed, if desired, to permit easy ingress and egress for an animal.

Figure 3:
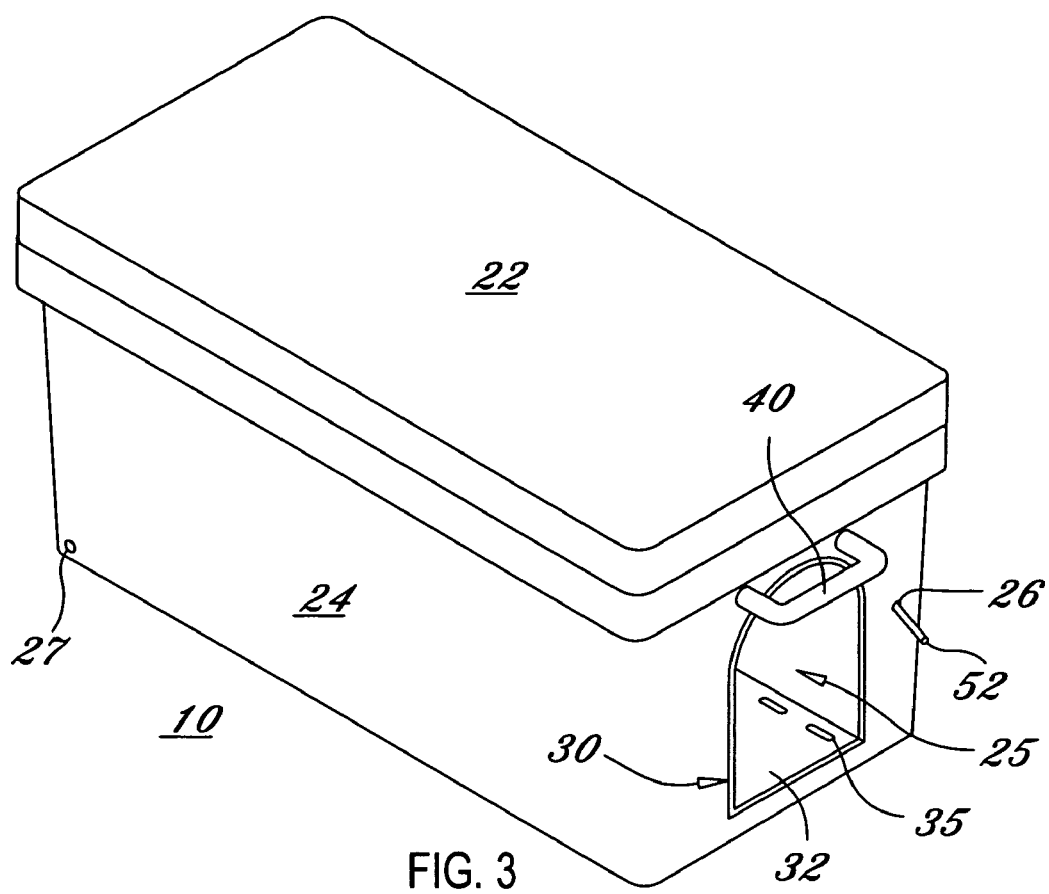
FIG. 3 is a perspective view of the insulated animal enclosure completely assembled in accordance with a preferred embodiment of the present invention.
Figure 4:
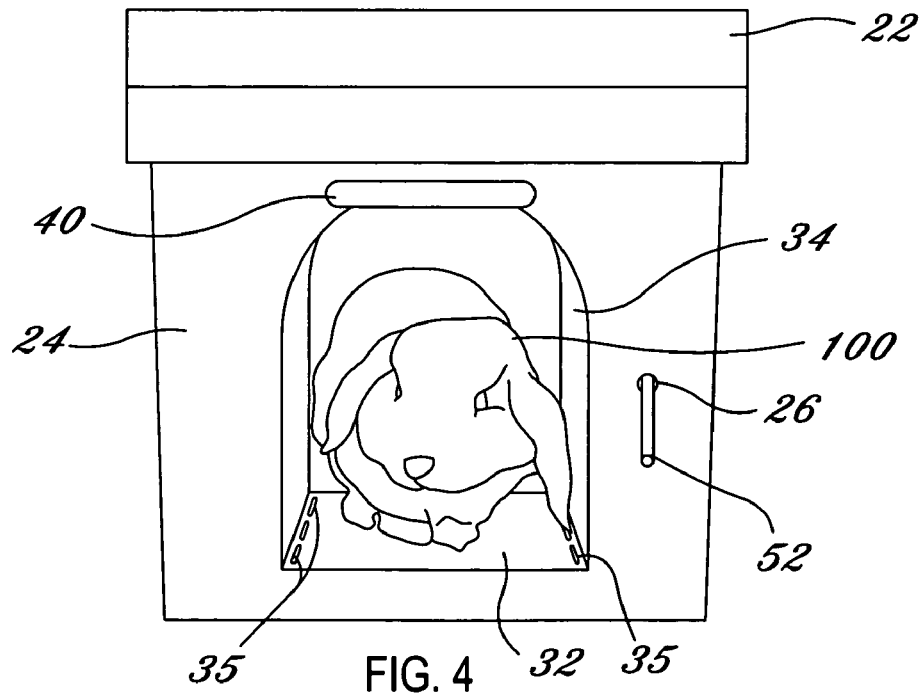
FIG. 4 is a front view showing the insulated animal enclosure completely assembled and in use by an animal in accordance with a preferred embodiment of the present invention.

As shown in FIGS. 1-3, the inner habitat 30 of the insulated animal enclosure 10 will preferably include a plurality of drain apertures 35 therein to permit the evacuation of water that collects within the inner habitat 30 due to condensation, rain, or a variety of other factors. The bottom portion 32 of the inner habitat 30 may be sloped towards these drain apertures 35, if desired, to aid drainage of excess water. Additionally, as shown in FIGS. 1-3, a drain aperture 27 may be formed in the outer housing 20 as well so that any excess water collected within the structure is evacuated outside the insulated animal enclosure. In the preferred embodiment, the drain aperture 27 will be a capped drain aperture, not a continuous draining hole. It will be appreciated by those skilled in the art that the drain aperture 27 of the outer housing 20 may be formed in any of a wide variety of differing configurations without departing from the present invention. If desired, the inner surface of the bottom portion 28 may be sloped towards the drain aperture 27 to aid drainage of excess water.

Additionally, as shown in the figures, the outer housing 20 will include an opening 26 for a water bottle nozzle 52 so that a water bottle 50 may be placed within the outer housing 20 with the water bottle nozzle 52 extending therethru as best illustrated in FIG. 2.

The inner habitat 30 of the insulated animal enclosure 10 will be configured for placement in a relatively spaced-apart manner from the side walls 24 and cover portion 22 of the outer housing 20 as illustrated throughout the figures. As such, in a preferred embodiment of the present invention, cooling means 60 may be placed inside the outer housing 20 as shown so as to cool the inner habitat 30 as desired. Any of a wide variety of cooling means 60 may be utilized without departing from the present invention. For example, the cooling means 60 may include ice, ice packs, cooling gel packs, and the like. In a preferred embodiment, the cooling means 60 will include reusable gel packs as illustrated in FIGS. 1-2.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An insulated animal enclosure, comprising:
    a substantially enclosed inner habitat having an opening therein for animal ingress and egress, said inner habitat having a bottom portion and a top portion extending upwardly therefrom so as to form a hollow habitable interior,
    an outer housing configured to substantially surround said inner habitat at a spaced-apart distance thereof and comprising a bottom portion, a plurality of upstanding sidewalls extending upwardly from said bottom portion, and a removable cover portion, said outer housing configured to enclose a water bottle and containing an opening to extend a nozzle of said water bottle therethrough;
    at least one of said upstanding sidewalls having an opening therein corresponding to said opening of said inner habitat so as to permit animal ingress and egress to said inner habitat, and
    cooling means placed within said spaced-apart distance between said outer housing and said inner habitat.

2. An insulated animal enclosure comprising:
    a substantially enclosed inner habitat having an opening therein for animal ingress and egress, said inner habitat having a bottom portion and a top portion extending upwardly therefrom so as to form a hollow habitable interior,
    an insulated outer housing configured to substantially surround said inner habitat at a spaced-apart distance thereof and comprising a bottom portion, a plurality of upstanding sidewalls extending upwardly from said bottom portion, and a removable cover portion, said outer housing outer housing configured to enclose a water bottle and containing an opening to extend a nozzle of said water bottle therethrough;

at least one of said upstanding sidewalls having an opening therein corresponding to said opening of said inner habitat so as to permit animal ingress and egress to said inner habitat, and cooling means placed within said spaced-apart distance between said outer housing and said inner habitat.

3. An insulated animal enclosure comprising:

an inner habitat formed from a mailbox having a hollow habitable interior with a bottom portion, a top portion extending upwardly therefrom, and an opening for animal ingress and egress, an outer housing formed from an insulated cooler and configured to substantially surround said inner habitat at a spaced-apart distance thereof, said insulated cooler comprising a bottom portion, a plurality of upstanding sidewalls extending upwardly from said bottom portion, and a removable cover portion, at least one upstanding sidewall of said insulated cooler having an opening therein to correspond to said opening of said inner habitat;

cooling means placed within said spaced-apart distance, between said mailbox and said insulated cooler; and a water bottle contained within said insulated cooler, the water bottle having a nozzle configured to extend through a side wall of said insulated cooler.

* * * * *